United States Patent [19]

Hirano

[11] Patent Number: 5,941,962
[45] Date of Patent: Aug. 24, 1999

[54] BUFFER MANAGEMENT SYSTEM FOR RELEASING A BUFFER AREA BASED ON HOLDING TIME AND MAXIMUM ALLOWABLE TIME WHEN REMAINING BUFFER AREAS REACHED THRESHOLD

[75] Inventor: Keizo Hirano, Kawasaki, Japan

[73] Assignee: Fujitsu Limited, Kanagawa, Japan

[21] Appl. No.: 08/187,705

[22] Filed: Jan. 27, 1994

[30] Foreign Application Priority Data

Sep. 14, 1993 [JP] Japan ................................. 5-228493

[51] Int. Cl.⁶ ................................................ G06F 5/06
[52] U.S. Cl. ............................. 710/53; 710/56; 710/57; 711/100
[58] Field of Search .................... 395/250, 325, 395/427, 457, 200, 600, 497, 275, 309, 478, 463; 364/200, 927, 246, 222.81, 238; 710/129, 53, 56, 57; 711/100

[56] References Cited

U.S. PATENT DOCUMENTS

| | | | |
|---|---|---|---|
| 4,509,119 | 4/1985 | Gumacer et al. | 364/200 |
| 5,386,536 | 1/1995 | Courts et al. | 711/136 |
| 5,493,652 | 2/1996 | Koufopavlou et al. | 395/497.01 |
| 5,572,697 | 11/1996 | Chevalier et al. | 395/427 |

FOREIGN PATENT DOCUMENTS

| | | |
|---|---|---|
| 0 272 939 | 6/1988 | European Pat. Off. . |
| 0522224 | 1/1993 | European Pat. Off. . |

Primary Examiner—Thomas C. Lee
Assistant Examiner—Harold Kim
Attorney, Agent, or Firm—Helfgott & Karas, PC.

[57] ABSTRACT

In a buffer management system for managing a buffer pool, which is divided into a plurality of buffer areas, in response to an acquisition request sent from a processing apparatus, the buffer management system according to the present invention includes: a buffer managing unit for calculating and supervising the number of remaining vacant buffer areas before and after use of the buffer area; a buffer supervising unit operatively connected to the buffer managing unit for supervising a vacant state of each buffer area; and a holding unit operatively connected to the buffer managing unit for holding the number of remaining vacant buffer areas.

6 Claims, 7 Drawing Sheets

BUFFER MANAGEMENT SYSTEM FOR RELEASING A BUFFER AREA BASED ON HOLDING TIME AND MAXIMUM ALLOWABLE TIME WHEN REMAINING BUFFER AREAS REACHED THRESHOLD

BACKGROUND OF THE INVENTION

1. Field of the Invention

The present invention relates to a buffer management system provided in an information processing apparatus, and more particularly, it relates to a method and apparatus for managing a buffer pool effectively so as to avoid a failure, for example, a deadlock or an abnormal operation, of the system.

2. Description of the Related Art

An information processing apparatus, for example, a facsimile apparatus, has at least one buffer pool and a buffer management system for managing a buffer pool. In general, a buffer pool is used as a temporary storage to hold transmission/reception data, a control program and the like. Usually, a buffer pool is divided into a plurality of buffer areas, each of which is managed by the buffer management system. In an information processing system, it is necessary to avoid a failure, for example, a deadlock or an abnormal operation in order to utilize the buffer pool effectively.

The present invention has an improved structure as to the buffer pool and the buffer management system so that it is possible to avoid various failures.

SUMMARY OF THE INVENTION

The object of the present invention is to provide an improved buffer management system which can manage a buffer pool effectively and can avoid various failures.

In accordance with the present invention, there is provided a buffer management system for managing a buffer pool, which is divided into a plurality of buffer areas, in response to an acquisition request sent from a processing apparatus, the buffer management system including: a buffer managing unit for calculating and supervising the number of remaining vacant buffer areas before and after use of a buffer area; a buffer supervising unit operatively connected to the buffer managing unit for supervising the state of each buffer area; and a holding unit operatively connected to the buffer managing unit for holding the number of remaining vacant buffer areas.

In one preferred embodiment, the buffer managing unit includes a supervising unit for supervising the number of the remaining vacant buffer areas, a calculation unit for calculating the number of remaining vacant buffer areas, a buffer acquiring unit for acquiring one of vacant buffer area in the buffer pool, and a buffer releasing unit for forcedly releasing the buffer area.

In another preferred embodiment, the buffer supervising unit includes a time comparing unit for comparing a maximum allowable time for which a buffer area can be held with a time difference between a present time and an acquisition time of the buffer area; a present time setting unit for setting the present time; and an output unit for outputting a result of the comparison in the time comparing unit.

In still another embodiment, the buffer management system further includes an abnormality processing unit operatively connected to the buffer supervising unit for processing an abnormal state of the buffer pool.

In still another embodiment, the buffer management system further includes a time setting unit operatively connected to the buffer managing unit for setting an acquisition time of the buffer area.

In still another embodiment, the buffer management system further includes a timer unit operatively connected to the buffer supervising unit for setting the present time.

In still another embodiment, each of the buffer areas includes a first holding area for holding the acquisition time of the buffer area and a second holding area for holding the maximum allowable time for which the processing means can use the buffer.

In still another embodiment, the processing apparatus includes a processing unit for processing the result of the comparison in the buffer supervising unit, a requesting unit for requesting the acquisition of the buffer area, an instruction unit for instructing a forced release of the buffer area, and a time setting unit for setting the maximum allowable time.

In still another embodiment, when the time difference is larger than the maximum allowable time, the processing apparatus determines an abnormal state of the buffer area, and the buffer area is forcedly released from the abnormal state.

In still another embodiment, the supervising unit supervises the number of vacant buffer areas by comparing the number of remaining vacant buffer areas, which is held in the holding unit, with an allowable minimum number which is used as a threshold value of remaining vacant buffer areas.

In still another embodiment, when the number of remaining vacant buffer areas is larger than the threshold value, the processing unit performs a predetermined normal process and, when the number of remaining vacant buffer areas is smaller than the threshold value, the buffer managing means starts the buffer supervising means.

DESCRIPTION OF THE PREFERRED EMBODIMENTS

Before explaining the preferred embodiments of the present invention, a conventional art and its problems will be explained in detail below.

Figure 1:
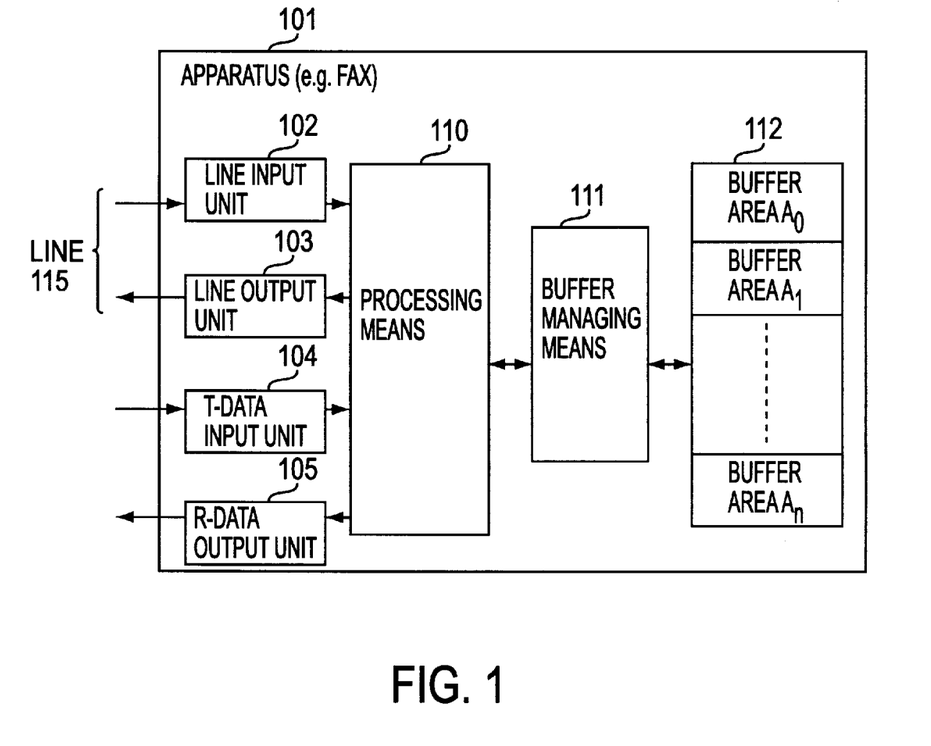
FIG. 1 is a schematic block diagram of an information processing apparatus, for example, a facsimile apparatus.

FIG. 1 is a schematic block diagram of an information processing apparatus, for example, a facsimile apparatus. This drawing is provided for explaining connection of the buffer managing means and the buffer pool in the apparatus. The problem of the conventional art is explained in FIG. 2, and the present invention is explained in FIGS. 3 to 7.

In FIG. 1, reference number 101 denotes an information processing apparatus, for example, a facsimile apparatus (FAX). Reference number 102 denotes a line input unit for receiving data sent from a line 115. Reference number 103 denotes a line output unit for sending data to the line 115. Reference number 104 denotes a transmission data (T-data) input unit for receiving data to be transmitted (below, transmission data) which is obtained by reading, for example, a document. Reference number 105 denotes a reception data (R-data) output unit for sending data received (reception data) by the line input unit 102 to a printer. Reference number 110 denotes a processing means for processing transmission/reception data. Reference number 111 denotes a buffer managing means for managing a buffer pool 112 in accordance with instructions from the processing means 110. The line 115 is connected to, for example, another facsimile apparatus.

Reference number 112 denotes the buffer pool which is formed by a plurality of buffer areas $A_0$ to $A_n$. Each of buffer areas stores reception data, transmission data, program data, etc. These data are held in one of buffer areas which is designated by the buffer managing means 111, and the designated buffer area is also released by the buffer managing means 111 when the transmission is completed.

Figure 2:
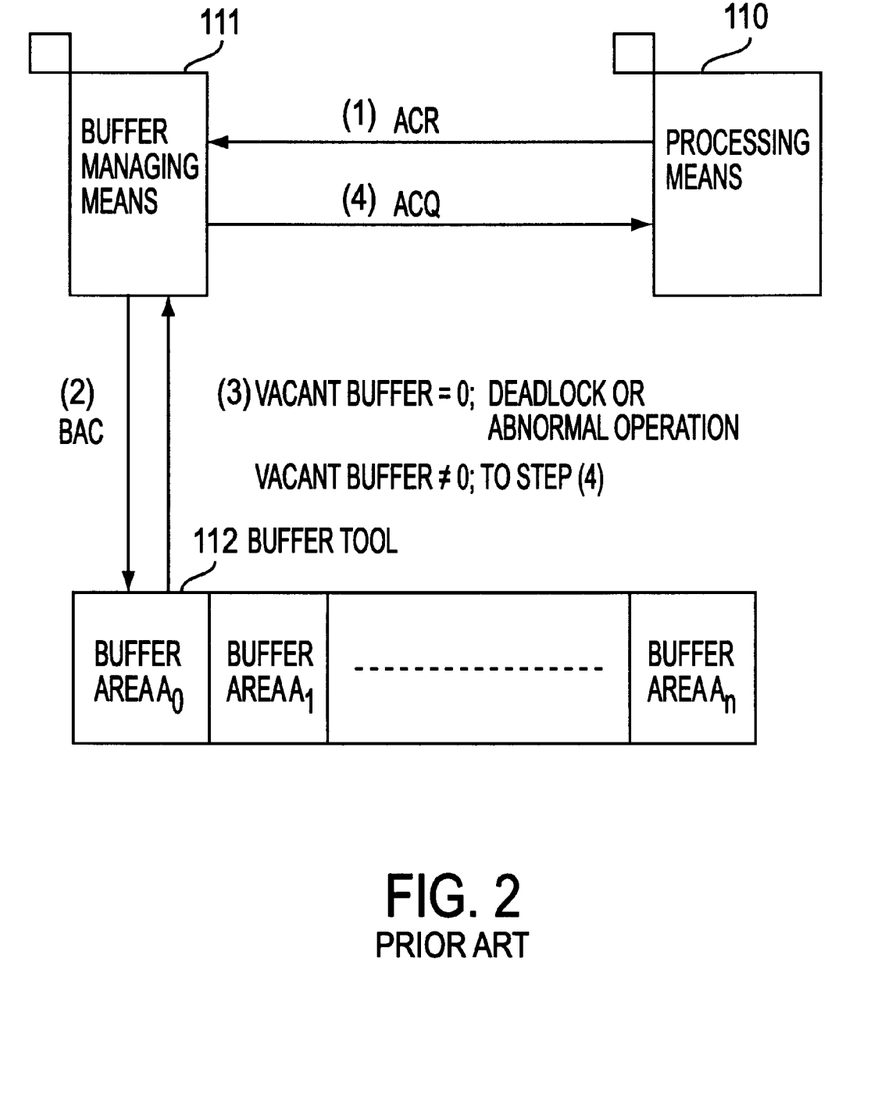
FIG. 2 is an explanatory view of an operation of the buffer managing means in FIG. 1.

FIG. 2 is an explanatory view of an operation of a conventional buffer managing means. The operation is explained with reference to FIG. 1. In FIG. 2, the same reference numbers as used in FIG. 1 are attached to the same components.

(1) The line input unit 102 receives data which are sent through the line 115. The processing means 110 sends a buffer acquiring request ACR to the buffer managing means 111 to acquire one buffer area for holding reception data.

(2) When the buffer managing means 111 receives the buffer acquiring request ACR, the buffer managing means 111 performs an acquiring process for one of the buffer areas in the buffer pool 112.

(3) and (4) When one of buffer areas is vacant (i.e., this is a state that the vacant buffer area is not zero), the buffer managing means 111 acquires the vacant buffer area, for example, the buffer area $A_0$, and informs acquisition of the buffer area ACQ to the processing means 110. Further, the buffer managing means 111 holds the reception data into the buffer area $A_0$.

On the contrary, when there is no vacant buffer area in the buffer pool 112, first, the buffer managing means 111 waits for the release of a buffer area. However, when the buffer managing means 111 cannot acquire a vacant area after a predetermined time has elapsed, the apparatus 101 falls into deadlock or an abnormal operation.

In a conventional art, it is very difficult to find a cause of failure because the conventional buffer managing means merely waits for the release of the buffer area when there are no vacant buffer areas in the buffer pool.

Figure 3:
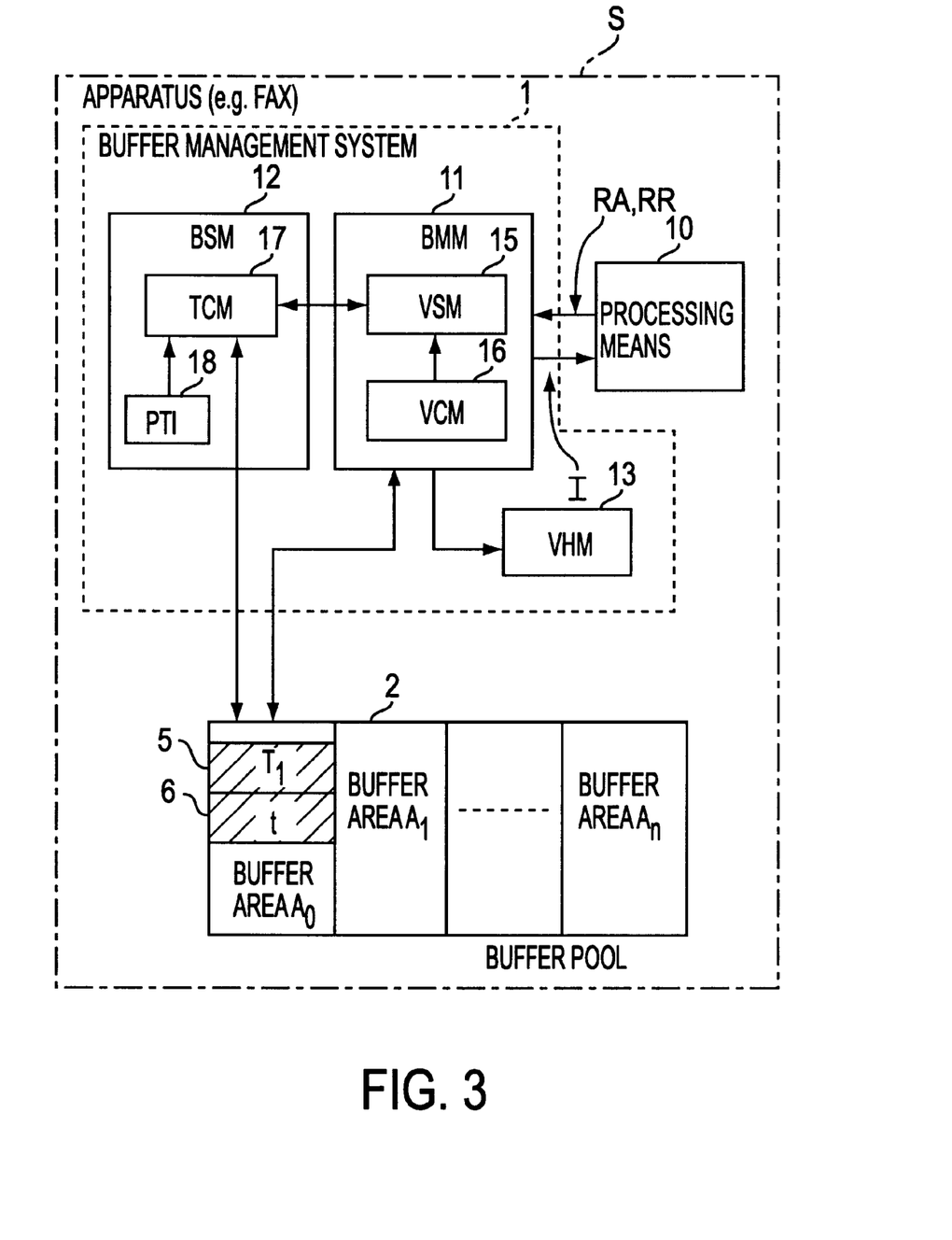
FIG. 3 shows a basic structure of a buffer management system according to the present invention.

FIG. 3 shows a basic structure of a buffer management system according to the present invention. In FIG. 3, reference character S denotes an information processing apparatus, for example, a facsimile apparatus (FAX), reference number 1 denotes a buffer management system according to the present invention. Reference number 2 denotes a buffer pool according to the present invention. The buffer pool is divided into a plurality of buffer areas $A_0$ to $A_n$.

Each of buffer areas has a first and second holding areas according to the present invention as explained below. That is, reference number 5 denotes the first holding area for holding an acquisition time $T_1$ when the buffer area is acquired. Further, reference number 6 denotes the second holding area for holding a maximum allowable time "t" which is held by a processing means 10.

The buffer management system 1 of the present invention includes a buffer managing means (BMM) 11, a buffer supervising means (BSM) 12, and a holding means (VHM) 13.

The buffer managing means 11 includes a supervisory means (VSM) 15 for supervising the number of remaining vacant buffer areas and a calculation means (VCM) 16 for calculating the number of remaining vacant buffer areas.

The buffer supervising means 12 includes a time comparing means (TCM) 17 and a present time indicator (PTI) 18.

Further, the holding means (VHM) 13 holds the number of remaining vacant buffer areas.

The operation of the structure of FIG. 3 is as follows. The processing means 10 sends an acquisition request RA for acquiring the buffer area to the buffer managing means 11.) When the buffer management means 11 receives the acquisition request RA, the buffer management means 11 searches the vacant buffer area in the buffer pool 2, and sends an information I regarding the vacant buffer areas to the processing means 10.

At that time, the calculation means 16 decrements the number of the vacant buffer areas, which are held in the holding means 13, by one, and calculates the number of remaining vacant buffer areas after acquisition of the buffer area. Further, the holding means 13 holds the number of remaining vacant buffer areas which are calculated by the calculation means 16. Further, the processing means 10 performs normal processes using the buffer area acquired.

When the processing means 10 releases the buffer area after completion of normal processes, the processing means 10 sends a release request RR for releasing the buffer area to the buffer management means 11. When the buffer managing means 11 receives the release request RR, the buffer managing means 11 releases the buffer area which is designated by the processing unit 10.

Further, the calculation means 16 adds the count "1" to the number of remaining vacant buffer areas which is held in the holding means 13, and calculates the number of remaining vacant buffer areas after the buffer area is released. Still further, as a result of above calculation, the holding means 13 holds the number of remaining vacant buffer areas.

On the other hand, the supervisory means 15 determines whether or not the number of remaining vacant buffer areas calculated by the calculation means 16 is lower than a threshold value which is previously given. When the number of remaining vacant buffer areas is lower than the above threshold value, the supervisory means 15 informs this state to the buffer supervising means 12 to determine whether the buffer pool is normal.

In the buffer supervising means 12, the time comparing means 17 acquires the present time $T_0$ from a timer means (see, FIG. 4), and further acquires an acquisition time $T_1$ from the first holding area 5 and a maximum allowable time "t" from the second holding area 6.

Still further, the time comparing means 17 calculates the time difference between the present time $T_0$ and the acquisition time $T_1$, and compares the maximum allowable time "t" with the time difference $(T_0-T_1)$.

When there is a buffer area for which the time difference $(T_0-T_1)$ is larger than the maximum allowable time "t", the buffer supervising means 12 determines an abnormal state of the buffer pool and outputs "abnormal process" to the buffer managing means 11.

When there is the buffer area indicating that the time difference $(T_0-T_1)$ is smaller than the maximum allowable time "t", the buffer supervising means 12 determines a normal state, and continues the predetermined process from the processing means 10.

Figure 4:
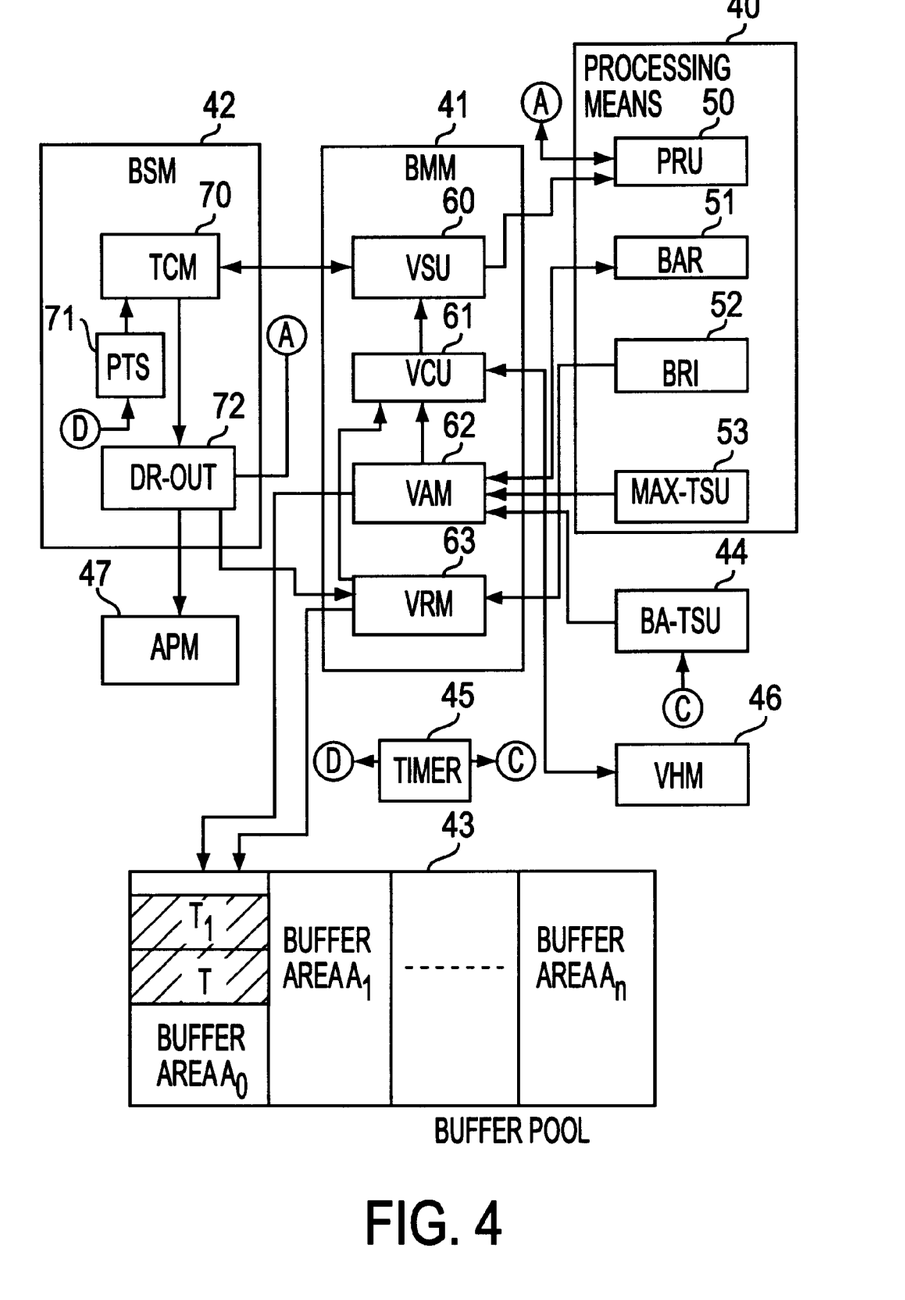
FIG. 4 is a detailed block diagram of a buffer managing system according to an embodiment of the present invention.

FIG. 4 is a detailed block diagram of a buffer managing system according to an embodiment of the present invention. Reference number 40 denotes a processing means which corresponds to the processing means 10 of FIG. 3. Reference number 41 denotes a buffer managing means (BMM) which corresponds to the buffer managing means 11 of FIG. 3. Reference number 42 denotes a buffer supervising means (BSM) which corresponds to the buffer supervising means 12 of FIG. 3.

Reference number 43 denotes a buffer pool which corresponds to the buffer pool 2 of FIG. 3. Reference number 44 denotes a time setting means (BA-TSU) for setting the acquisition time of the buffer area. This means 44 includes a timer 45. Reference number 46 denotes a holding means (VHM) for the number of remaining vacant buffer areas which corresponds to the holding means 13 of FIG. 3.

Reference number 47 denotes an abnormal processing means (APM) which is used when the abnormal state occurs. When detecting the abnormal state, the abnormal processing means 47 outputs an "abnormal information" signal, and performs the recovery process.

The processing means 40 includes a process unit (PRU) 50 for holding a processing program, a request unit (BAR) 51 for requesting the acquisition of the buffer area, an instruction unit (BRI) 52 for releasing the buffer area which was acquired, and a time setting unit (MAX-TSU) 53 for setting the maximum allowable time.

The buffer managing means (BMM) 41 includes a supervising unit (VSU) 60 for supervising the number of remaining vacant buffer areas, a calculating unit (VCU) 61 for calculating the number of remaining vacant buffer areas, an acquiring unit (VAM) 62 for searching for and acquiring vacant buffer areas and informing the same to the processing means 40, and a releasing unit (VRM) 63 for releasing the buffer area which is designated by instructions from the instruction unit 52.

The buffer supervising means (BSM) 42 includes a time comparing unit (TCM) 70, a time setting unit (PTS) 71 for setting the present time, which is detected by the timer 45, into the time comparing unit 70, and an output unit (DR-OUT) 72 for informing the result of the decision as to whether or not the abnormal state occurs based on the result of comparison at the time comparing unit 70.

As explained above, the buffer pool 43 is formed by a plurality of buffer areas $A_0$ to $A_n$. Each of buffer areas, for example, the buffer area $A_0$ includes a first holding area 73 (corresponding to reference number 5 of FIG. 3) for holding the acquisition time $T_1$ and a second holding area 74 (corresponding to reference number 6 of FIG. 3) for holding the maximum allowable time "t".

Figure 5:
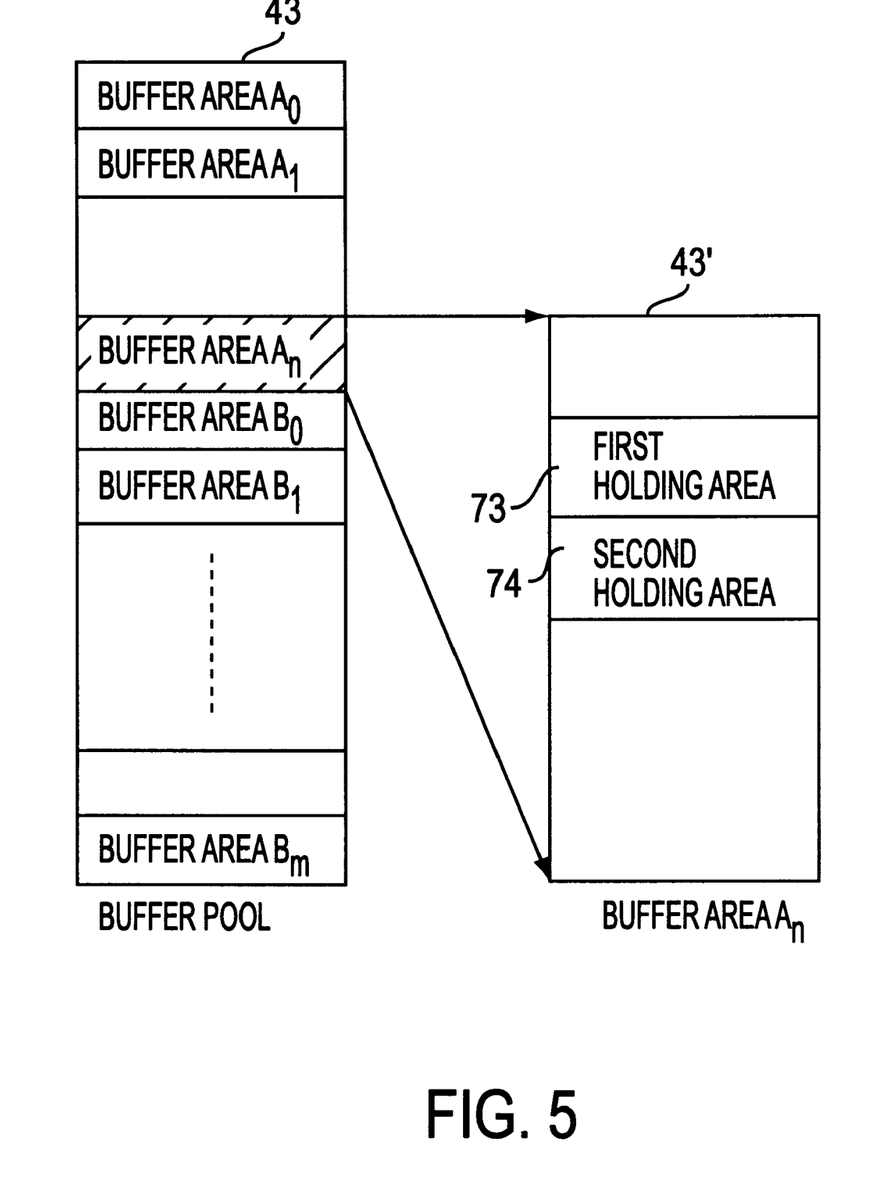
FIG. 5 is a detailed explanatory view of the buffer pool according to the present invention.

FIG. 5 is a detailed explanatory view of the buffer pool according to the present invention. For example, this buffer pool 43 is formed by two groups, i.e., one is formed by the buffer areas $A_0$ to $A_n$, and the other is formed by the buffer areas $B_0$ to $B_m$. For example, one group is used for storing transmission data, and the other is used for storing reception data.

The enlarged buffer area $A_n$ is indicated by the reference number 43'. As explained in FIG. 4, the buffer area $A_n$ includes the first holding area 73 for holding the acquisition time $T_1$ and the second holding area 74 for holding the maximum allowable time "t".

Figure 6:
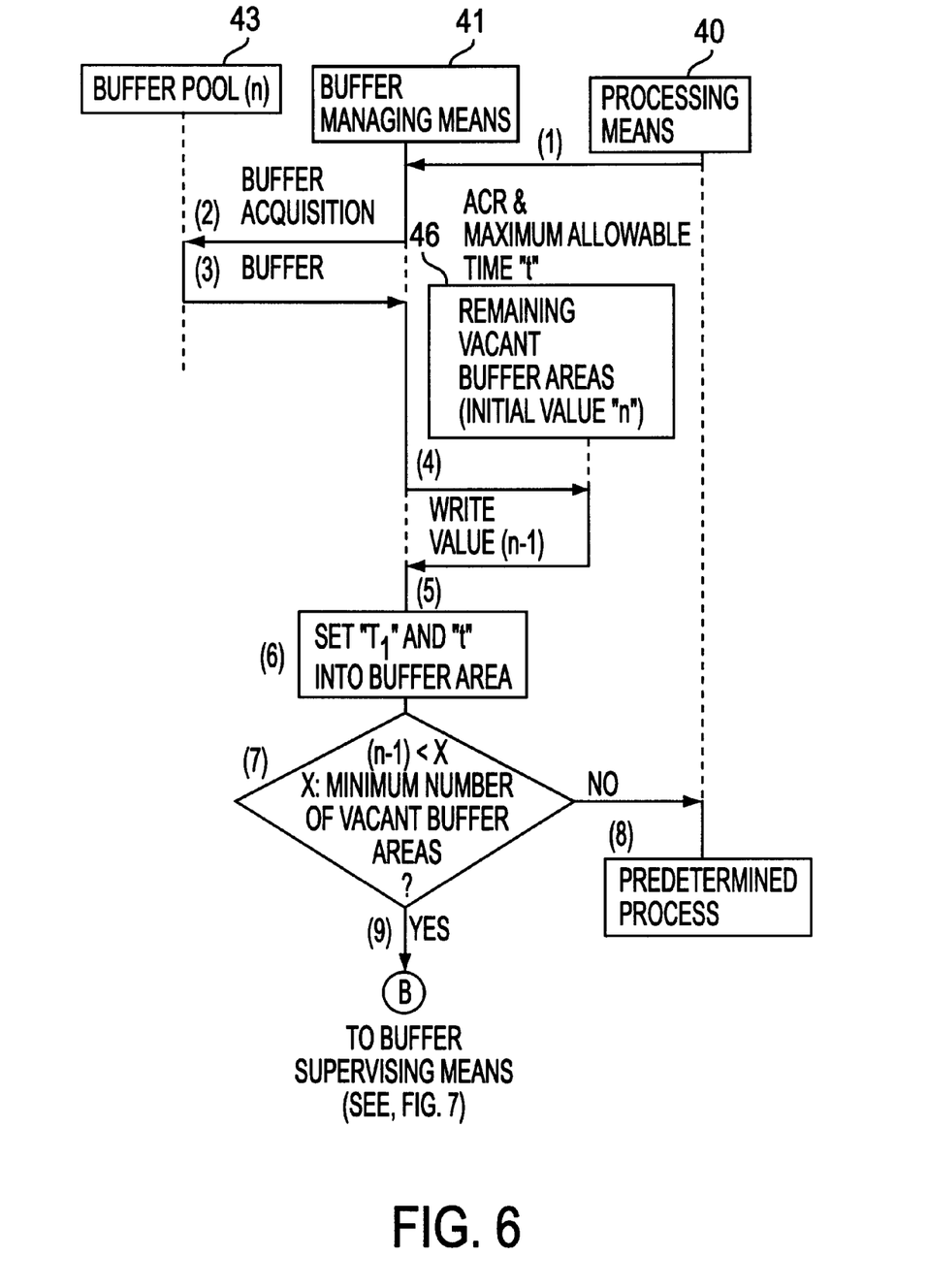
FIGS. 6 and 7 are explanatory views of an operation of the buffer managing apparatus according to the present invention.
Figure 7:
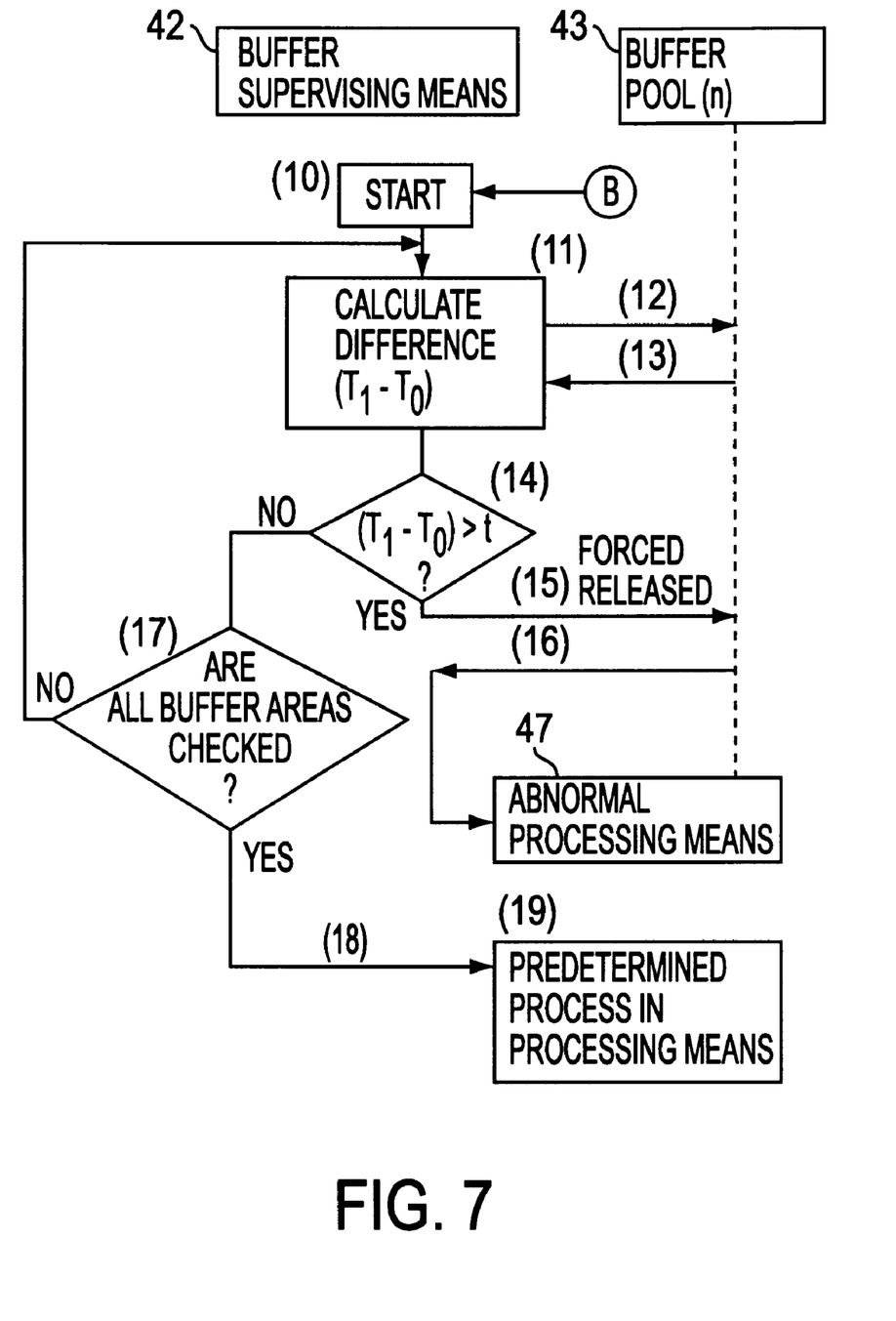

FIGS. 6 and 7 are explanatory views of the operation of the buffer management system according to the present invention. The operation is explained with reference to FIG. 4.

In step (1), the requesting unit (BAR) 51 sends the acquisition request ACR and the maximum allowable time "t" to the buffer managing means 41 in order to obtain the buffer area of the buffer area 43. At the same time, the time setting unit (MAX-TSU) 53 sets the maximum allowable time "t" in the processing unit 40. In this case, when the maximum allowable time "t" is not set in the processing unit 40, the time setting unit 53 sets the maximum allowable time "t", which was previously given, to the buffer managing means 41.

In steps (2) and (3), the buffer acquiring means (VAM) 62 in the buffer managing means 41 searches the remaining vacant buffer areas in the buffer pool 43, and acquires a buffer area when there is a vacant buffer area therein.

In steps (4) and (5), the calculation unit (VCU) 61 obtains the number of vacant buffer areas "n" at the present time from the holding means 46 (see, reference number 13 of FIG. 3), and calculates the number of the remaining vacant buffer areas (n-1) which is obtained by subtracting "1" from the present vacant buffer areas "n". Further, the vacant buffer areas "n-1" is held in the holding means (VHM) 46.

In step (6), the buffer managing means 41 receives the buffer acquiring time $T_1$ from the time setting means 44, and sets the buffer acquiring time $T_1$ into the first holding area 73 of the buffer area which is acquired. Further, the buffer managing means 41 receives the maximum allowable time "t" from the maximum allowable time setting unit 53, and sets the maximum allowable time "t" into the second holding area 74 of the buffer area.

In step (7), the supervising unit (VSU) 60 for supervising the remaining vacant buffer areas compares the number of remaining vacant buffer areas (n-1), which is held in the holding means 46, with an allowable minimum number (i.e., threshold value) "x" of remaining vacant buffer areas.

In step (8), when (n-1)>x in step (7), the processing unit (PRU) 50 in the processing means 40 performs the predetermined normal process since the number of remaining vacant buffer areas are larger than the threshold value.

In step (9), when (n-1)<x in step (7), the buffer managing means 41 starts the buffer supervising means 42 since the number of remaining vacant buffer areas is smaller than the threshold value.

The following processes are shown in FIG. 7.

In step (10), the buffer supervising means 42 is started based on the instruction from the buffer managing means 41 in step (9).

In steps (11), (12) and (13), the buffer supervising means 42 accesses the buffer pool 43, and acquires the buffer acquiring time $T_1$ from the first holding area 73. The time comparing unit 70 calculates the time difference between the buffer acquiring time $T_1$ and the present time $T_0$. The present time $T_0$ is obtained from the timer 45 through the present time setting unit 71.

In step (14), the time comparing unit 70 obtains the time difference ($T_1-T_0$) and the maximum allowable time "t" which is held in the second holding area 74, and compares the time difference ($T_1-T_0$) with the maximum allowable time "t".

In steps (15) and (16), when ($T_1-T_0$)>t in step (14), the processing unit 50 determines the abnormal state of the buffer area. This means that the predetermined contents are held in the buffer area longer than the maximum allowable time "t". When detecting the abnormal state, the output unit 72, which is provided for outputting the result of decision, instructs a forced release of that buffer area to the buffer release means (VRM) 63. The buffer release means 63 forcedly releases the designated buffer area. Further, the buffer release means 63 informs the abnormal state to the abnormal processing unit 47.

In steps (17), (18) and (19), when $(T_1-T_0)<t$ in step (14), the processing unit (PRU) 50 determines that the buffer area is normal since the contents of the buffer area is held within the maximum allowable time "t".

Further, the processing unit 50 determines whether or not all buffer areas, which are already acquired, are checked. When all buffer areas are not checked (NO), the process returns to the step (11), and the comparing unit 70 performs the step 11 again. Further, when all buffer areas are checked (YES), the processing unit 50 determines that all processes which are held in the buffer pool are normal. In step (19), the processing means 40 performs the predetermined process.

I claim:

1. A buffer management system (1) for managing a buffer pool (2) which is divided into a plurality of buffer areas $(A_0-A_n)$, said buffer management system comprising:

a buffer managing means (11), for calculating and supervising in response to an acquisition request (RA) sent from a processing means (10), the number of remaining vacant buffer areas before and after use of the buffer area;

a buffer supervising means (12) operatively connected to the buffer managing means for supervising a vacant state of each buffer area; and a holding means (13) operatively connected to the buffer managing means for holding the number of remaining vacant buffer areas, wherein said buffer supervising means (12) comprises a time comparing means (70) for comparing a maximum allowable time (t), for which the buffer area can be held, with a time difference $(T_1-T_0)$ between a present time $(T_0)$ and an acquisition time $(T_1)$ of the buffer area; a present time setting unit (71) for setting the present time; and an output unit (72) for outputting a result of comparison in the time comparing unit, wherein said buffer managing means (11) comprises a supervising unit (60) for supervising the number of remaining vacant buffer areas, a calculation unit (61) for calculating the number of remaining vacant buffer areas, a buffer acquiring means (62) for acquiring one of vacant buffer areas in the buffer pool, and a buffer releasing unit (63) for forcedly releasing the buffer area, and wherein the supervising unit (60) supervises the number of vacant buffer areas by comparing the number of remaining vacant buffer areas (n−1), which is held in the holding means (46), with an allowable minimum number which is used as a threshold value (x) of the remaining vacant buffer areas, when the number of remaining vacant buffer areas (n−1) is larger than the threshold value (x), the processing unit (50) performs a predetermined normal process and, when the number of remaining vacant buffer areas (n−1) is smaller than the threshold value (x), the buffer managing means (41) starts the buffer supervising means (42).

2. A buffer management system as claimed in claim 1, further comprising an abnormal processing means (47) operatively connected to the buffer supervising means (12, 42) for processing an abnormal state of the buffer pool.

3. A buffer management system as claimed in claim 1, further comprising a time setting means (44) operatively connected to the buffer managing means (11, 41) for setting an acquisition time of the buffer area.

4. A buffer management system as claimed in claim 1, wherein each of the buffer areas comprises a first holding area (5, 73) for holding the acquisition time $(T_1)$ of the buffer area and a second holding area (6, 74) for holding the maximum allowable time (t) in which the processing means can use.

5. A buffer management system as claimed in claim 1, wherein the processing means comprises a processing unit (50) for processing the result of a comparison at the buffer supervising means, a requesting unit (51) for requesting the acquisition of the buffer area, an instruction unit (52) for instructing a forced release of the buffer area, and a time setting unit (53) for setting the maximum allowable time (t).

6. A buffer management system as claimed in claim 1, wherein when the time difference $(T_1-T_0)$ is larger than the maximum allowable time (t), the processing means determines an abnormal state of the buffer area, and the buffer area is forcedly released from the abnormal state.

* * * * *